United States Patent [19]

Kelley et al.

[11] 4,300,023
[45] Nov. 10, 1981

[54] HYBRID CIRCUIT

[75] Inventors: Stephen H. Kelley; William J. Lillis, both of Tempe, Ariz.

[73] Assignee: Motorola, Inc., Schaumburg, Ill.

[21] Appl. No.: 66,213

[22] Filed: Aug. 13, 1979

[51] Int. Cl.[3] .............................................. H04B 1/58
[52] U.S. Cl. ........................ 179/170 NC; 179/170 T
[58] Field of Search ........ 179/170 R, 170 NC, 170 T; 330/257

[56] References Cited

U.S. PATENT DOCUMENTS

| | | | |
|---|---|---|---|
| 3,849,609 | 11/1974 | Voorman | 179/170 NC |
| 4,004,109 | 1/1977 | Boxall | 179/170 NC |
| 4,142,075 | 2/1979 | Olschewski | 179/170 NC |
| 4,203,012 | 5/1980 | Boxall | 179/170 NC |

Primary Examiner—Bernard Konick
Assistant Examiner—Randall P. Myers
Attorney, Agent, or Firm—Vincent B. Ingrassia

[57] ABSTRACT

A direct coupled transformerless hybrid including a plurality of current mirror circuits for providing signal conversion between a balanced bidirectional transmission path and a pair of unbalanced unidirectional transmission paths. Means are provided for increasing the DC feed resistance in response to loop faults such as grounding of the ring terminal. This is accomplished by sourcing additional current into the ring and tip terminal termination resistors to reduce their equivalent impedance during normal operation.

9 Claims, 7 Drawing Figures

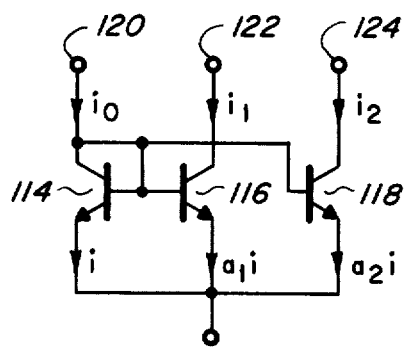
_Fig 2A_
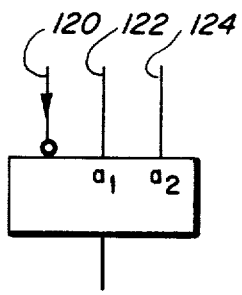
_Fig 2B_
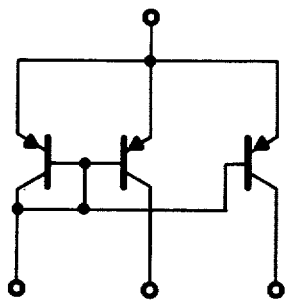
_Fig 2C_
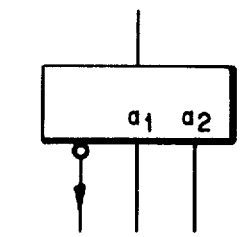
_Fig 2D_
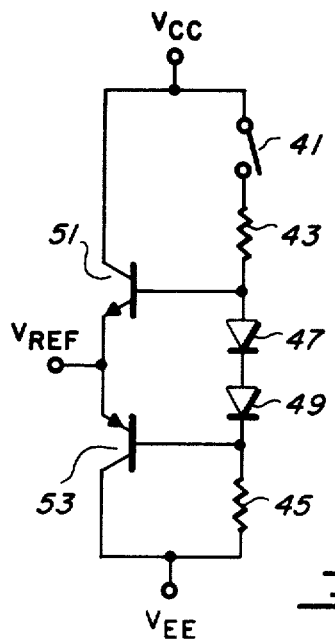
_Fig 4_
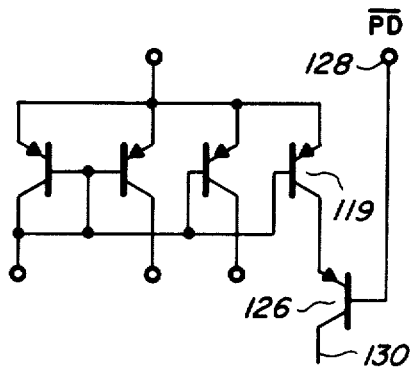
_Fig 3_

HYBRID CIRCUIT

BACKGROUND OF THE INVENTION

1. Field of the Invention

This invention relates generally to hybrid circuits for providing an interface between a pair of unbalanced unidirectional transmission paths and a balanced two wire bidirectional path and, more particularly, to such hybrid circuits which are direct coupled; i.e., transformerless.

2. Description of the Prior Art

Hybrid circuits are known which provide signal conversion between a balanced two wire bidirectional transmission path and a pair of unbalanced unidirectional transmission paths, the latter comprising a first path for carrying incoming electrical signals and a second path for carrying outgoing electrical signals. Hybrid circuits of this type are typically employed in telephone systems to provide a signal interface between a telephone carrier channel having the aforementioned pair of unidirectional transmission paths and a balanced bidirectional transmission path at either end of the carrier channel to which are connected the subscriber loop and the telephone instrument at one end and the central office equipment at the other end.

In the past, hybrid circuits have been conventionally implemented with transformers having a pair of loop terminals connected to the bidirectional signal path and terminals connected to the separate incoming and outgoing unidirectional signal paths. However, due to limitations inherent in transformer type hybrids, recent efforts have been directed to the design of transformerless hybrid circuits having substantially similar functional capability as transformer type hybrids. One such state of the art hybrid is shown and described in U.S. Pat. No. 3,849,609 and employs semiconductor current control current sources hereinafter referred to as current mirrors to convert incoming signals from one unidirectional transmission path to balanced signals on the bidirectional transmission path and to convert balanced signals originating in the bidirectional transmission path to outgoing signals on the other unidirectional transmission path. Circuits of this type possess the decided advantage of being monolithically integrable. This results in lower manufacturing costs, high reliability and small physical size.

U.S. Pat. No. 4,004,109 describes a transformerless hybrid which provides signal conversion between a balanced bidirectional transmission path and two unidirectional transmission paths, which suppresses longitudinal (common mode) signals originating in the bidirectional transmission path and which provides signal balance to suppress transmission of reflected echos from the incoming unidirectional transmission path to the outgoing unidirectional transmission path. Each embodiment disclosed includes a plurality of current mirror circuits, some of which are of complementary conductivity to the remaining current mirror circuits. Each current mirror circuit has a common terminal, one input terminal, at least one output terminal, and means for supplying currents to the output terminals which are proportional to the current at the input terminal.

SUMMARY OF THE INVENTION

It is an object of the present invention to provide an improved direct coupled hybrid circuit.

It is a further object of the present invention to provide an improved direct coupled hybrid circuit which includes DC fault protection circuitry.

It is a still further object of the invention to provide a direct coupled hybrid circuit which includes apparatus for sensing current flowing in the tip and ring terminals.

Finally, it is an object of the present invention to provide a direct coupled hybrid circuit which includes apparatus for monitoring longitudinal (common mode) current flowing in the subscriber loop.

According to a broad aspect of the invention there is provided a direct coupled hybrid circuit for providing signal conversion between a balanced bidirectional transmission path and a pair of unbalanced unidirectional transmission paths, said hybrid circuit comprising: first and second loop terminals coupled to said bidirectional transmission path; first and second unidirectional terminals coupled to a different one of said pair of unidirectional transmission paths; a plurality of current mirror circuits coupled to said loop terminals and to said unidirectional terminals, said plurality of current mirror circuits including current mirror circuits for coupling signals at said loop terminals to said second unidirectional terminal and for coupling incoming signals on said first unidirectional terminal to said loop terminals; first resistive means coupled between said first loop terminal and a first one of said plurality of current mirror circuits; second resistive means coupled between said second loop terminal and a second one of said plurality of current mirror circuits; and means for altering the resistance of said first and second resistive means from a first predetermined value to a second predetermined value in response to current flowing in only said second resistive means.

According to a further aspect of the invention there is provided in a direct coupled hybrid circuit which provides signal conversion between a balanced bidirectional transmission path coupled to tip and ring terminals and a pair of unbalanced unidirectional transmission paths coupled to input and output terminals, an apparatus for monitoring tip and ring currents comprising: first and second terminating resistive means coupled to said tip and ring terminals, respectively; a tip sense terminal; a ring sense terminal; first means coupled to said first resistive means and to said tip sense terminal for duplicating the current in said first resistive means; and second means coupled to said second resistive means and to said ring sense terminal for duplicating the current in said second resistive means.

According to a still further aspect of the invention there is provided in a direct coupled hybrid circuit which provides signal conversion between a balance bidirectional transmission path and a pair of unbalanced unidirectional transmission paths, an apparatus for monitoring longitudinal currents in said bidirectional path comprising: first and second loop terminals coupled to said bidirectional transmission path; first and second terminating resistive means coupled respectively to said first and second loop terminals; first and second current mirror circuit means coupled to said first and second resistive means, each generating an output in response to a current mismatch in said first and second resistive means; a longitudinal sense terminal; and means coupled to said first and second current mirror circuit means and having an output coupled to said longitudinal sense terminal for summing the outputs of said first and second current mirror circuit means.

BRIEF DESCRIPTION OF THE DRAWINGS

FIGS. 2A–2D are schematic diagrams illustrating current mirrors suitable for use in the circuit of FIG. 1;

FIG. 3 is a schematic diagram of the current mirror circuit shown in FIG. 2C including a switching output; and FIG. 4 is a schematic diagram of a reference voltage generator suitable for use in the circuit of FIG. 1.

DESCRIPTION OF THE PREFERRED EMBODIMENT

Figure 1:
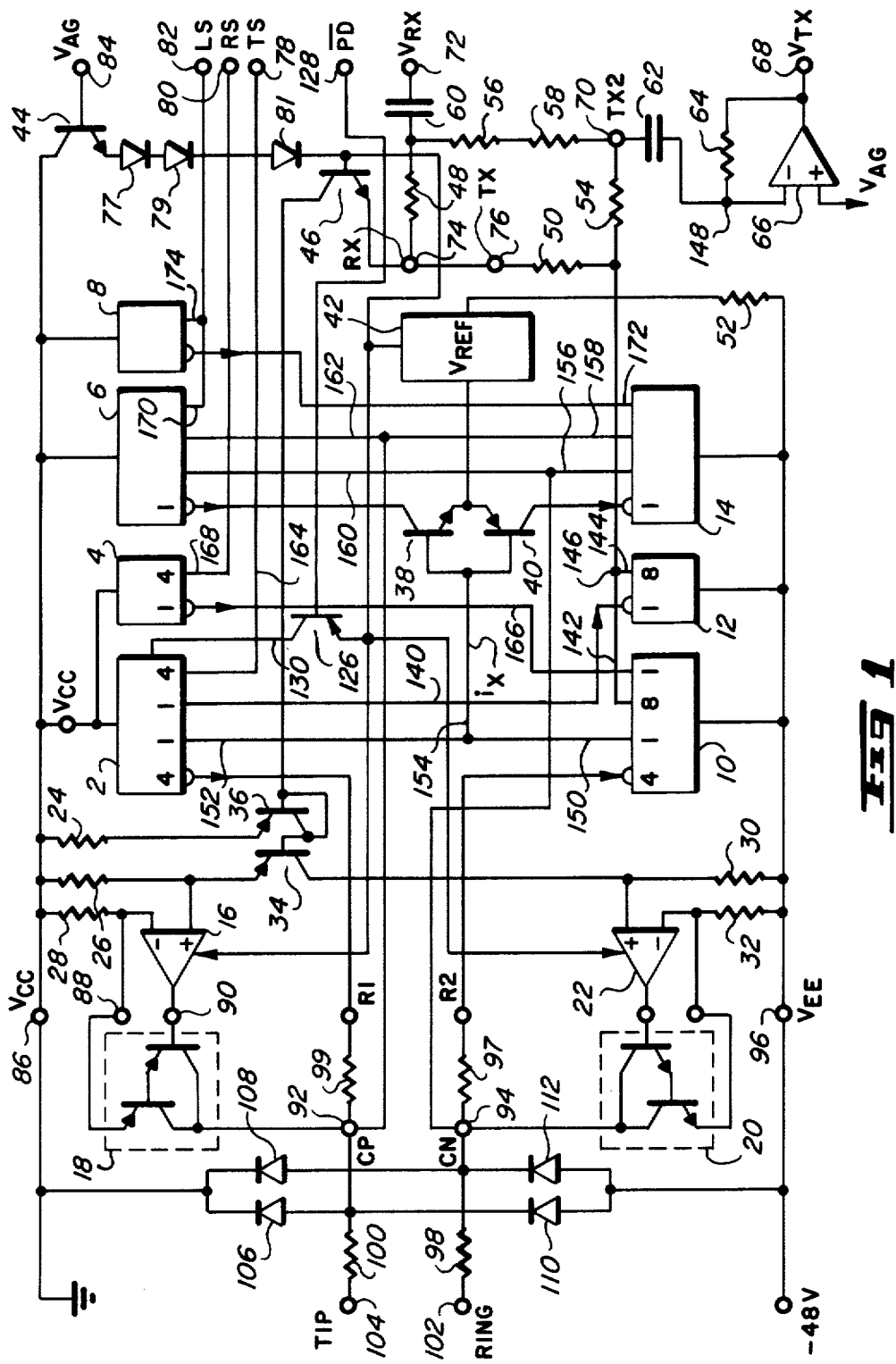
FIG. 1 is a schematic diagram of the inventive hybrid circuit.

FIG. 1 illustrates the inventive hybrid circuit partially in block diagram form and partially in schematic form. As can be seen, the hybrid includes a plurality of current mirror circuits 2, 4, 6 and 8 of a first conductivity type and a plurality of current mirror circuits 10, 12 and 14 of a complementary conductivity type. Each current mirror circuit has an input terminal designated by small circle and one or more output terminals. The current present at the output terminals of each current mirror circuit is proportional to the input current to that mirror circuit. The proportionality may be integral, fractional or governed by an irrational numeric quantity. For example, the current present at the input terminal of current mirror circuit 4 is multiplied by a factor of four at its corresponding output terminal. The sense of the arrow adjacent the input terminal circuit indicates the direction of current flow through a given current mirror circuit and thus the conductivity type. An arrow pointing away from the input terminal designates a PNP type current mirror, and an arrow pointing towards the input terminal designates an NPN type current mirror. Thus, in FIG. 1, current mirror circuits 2, 4, 6 and 8 are of the PNP type while current mirrors 10, 12 and 14 are of the NPN type.

FIG. 2A is a circuit diagram showing one implementation of an NPN type current mirror. The current mirror comprises a diode connected input transistor 114 which provides a relatively low input impedance and the plurality of output transistors 116 and 118 having their bases connected to the base of input transistor 114. The emitters of transistors 114, 116 and 118 are connected together. Since the collector currents of transistors 116 and 118 are independent of collector voltage, these elements provide relatively high output impedance.

Since transistors 114, 116 and 118 have the same base-emitter voltage, the respective emitter currents are proportional to the relative areas of the respective base emitter junctions, where the area of transistor 114 is taken to be unity. Ignoring small base currents, $i_0$ equal i, $i_1$ equals $a_1 i_0$, $i_2$ equal $a_2 i_0$ where $a_1$ and $a_2$ are the relative areas of the base-emitter junctions of transistors 116 and 118 respectively.

It should be noted that the current mirror operates as described only if the instantaneous input current is in the direction indicated and the output voltages do not saturate output transistors 116 and 118. FIG. 2B represents a convenient circuit symbol for the current mirror circuit of FIG. 2A. Input terminal 120 is designated by a small circuit adjacent to the block outline. Output terminals 122 and 124 are identified by characters $a_1$ and $a_2$ respectively, indicating the proportionality of the respective output current to the input current.

FIGS. 2C and 2D illustrate respectively the circuit diagram of a PNP current mirror circuit and the corresponding circuit symbol as employed herein.

Since the transistors shown in the current mirror circuits of FIGS. 2A and 2C can be fabricated by simultaneous diffusion into a single monolithic semiconductor substrate, they can be very closely matched.

Other embodiments of NPN and PNP current mirror circuits are known. For example, resistors inserted in series with each of the emitter leads will improve the accuracy of the current ratios. The circuit symbols of FIGS. 2B and 2D as used in the hybrid circuit of FIG. 1 may represent any appropriate embodiment of the respective current mirrors and are not necessarily limited to the embodiments of FIGS. 2A and 2C.

Referring again to FIG. 1, it may be seen that two additional current mirror circuits are employed. The first is a PNP current mirror circuit and comprises Darlington power transistors 18, operational amplifier 16, resistors 24, 26 and 28, and transistors 34 and 36. The base of transistor 36 represents the input to this current mirror circuit, the collector of transistor 34 represents a first output of the collectors of transistors 18 represent a second output.

Darlington pair 20, operational amplifier 22 and resistors 30 and 32 comprise an additional current mirror circuit. It is to be noted that transistors 18 and transistors 20 are of opposite conductivity type. Furthermore, transistors 18 and 20 are commercially available as single packages from, for example, Motorola Semiconductor Inc. and bear Part Nos. MJE270 and MJE271 respectively. Tip and ring terminals 104 and 102 respectively are coupled to a two wire loop (not shown) which is in turn coupled to a telephone instrument at its far end. Resistors pairs R1, R3 (99, 100) and R2, R4 (97, 98) are terminating resistors which, in part, determine the DC feed resistance $r_f$ of the hybrid. A protection circuit comprised of diodes 106, 108, 110 and 112 are coupled between a battery (typically −48 volts) and earth ground. The protection circuit is placed between resistors in each terminating pair as shown in FIG. 1.

Transistors 38 and 40 are coupled in a common base and common emitter configuration to detect the sense of current $i_x$. If the sense is positive (i.e., flowing out of the bases of transistors 38 and 40), current mirror circuit 14 will be turned on. On the other hand, if the current is negative (i.e., flowing into the bases of transistors 38 and 40), current mirror circuit 6 will be turned on.

The emitters of transistors 38 and 40 receive from a reference voltage generator 42 a reference voltage corresponding to $$\frac{V_{CC} - V_{EE}}{2}$$

where $V_{CC}$ is earth ground and $V_{EE}$ is typically −48 volts. Therefore, the reference voltage applied to the emitters of transistors 38 and 40 will be approximately −24 volts when the reference voltage generator 42 is on. When reference voltage generator 42 is off, resistor 52 pulls the reference voltage down to approximately $V_{EE}$.

Current mirror circuit 2 includes a switch having an output line 130 which is coupled to an input of the reference voltage generator 42. The switch may comprise a PNP transistor 119 having a base coupled to the current mirror circuit and having a collector coupled to the emitter of PNP transistor 126, the emitter of which is coupled to voltage reference generator 42 and the base of which is coupled to terminal 128 as shown in FIG. 3 for reasons to be discussed below. The switch in current mirror circuit 2 (transistor 119) is configured to be on when current is flowing through resistor R1 (99) and to be off when no current is flowing in R1. When on, the switch enables reference voltage generator 42. When off, however, reference voltage generator 42 is disabled as are operational amplifiers 16 and 22.

FIG. 4 is a representative of a circuit suitable for use as reference voltage generator 42. The switch in current mirror circuit 2 is shown functionally as switch 41 in FIG. 4. A resistive voltage divider comprised of resistors 43 and 45 is coupled between $V_{CC}$ and $V_{EE}$. Two base-emitter diodes 47 and 49 are coupled in series with resistors 43 and 45. These bias the bases of transistors 51 and 53. The reference voltage is taken off the emitters of transistors 51 and 53. With zero current in resistor R1 (99), switch 41 is open and the bases of transistors 51 and 53 will lie at $V_{EE}$. If current is flowing in R1 (99 in FIG. 1), switch 41 is closed and the voltage at the bases of transistors 51 and 53 will be approximately $(V_{CC}-V_{EE})/2$ since resistors 43 and 45 are equal.

Terminals 68 and 72 are the unidirectional outgoing and incoming signal terminals respectively. Outgoing terminal 68 is AC coupled to voltage converter comprised of capacitor 62, resistor 64 and operational amplifier 66 having its noninverting input coupled to earth ground. AC current at terminal 70 will flow through capacitor 62 and resistor 64 resulting in a voltage at the output of operational amplifier 66 (terminal 68) which is proportional to the current at terminal 70.

Incoming terminal 72 is coupled to an input circuit comprised of capacitor 60 and resistor 48. This circuit converts the low impedance input voltage into current at terminal 74.

Resistors 58 and 56 comprise a balanced network between current flowing out of node 70 and the AC voltage appearing at input terminal 72. As will be described later, this provides for trans-hybrid cancellation.

Output terminals 78 and 80 (TS and RS respectively) are sensing outputs. That is, current sourced from terminal 80 equals the current flowing in resistor R2 (97), and current sourced from terminal 78 equals the current flowing in resistor R1 (99). Thus, both of these output terminals are high impedances when the telephone instrument is on hook.

VAG input terminal 84 serves as input signal ground for the receive or transmit ports 72 and 68 respectively. It isolates the signal ground from $V_{CC}$ or the system ground. Transistor 44 provides an emitter output which has a low impedance to VAG. A string of diodes 77, 79 and 81 provides a voltage drop which in turn provides the necessary common mode range at the base of transistor 36 when $V_{CC}$ and VAG are equal. The diode string is coupled to the input of voltage reference generator 42 which is likewise coupled to the bias control inputs of operational amplifiers 16 and 22 and to the output of switch 126.

For an explanation of the DC characteristics of the hybrid circuit shown in FIG. 1, it is assumed that there is no incoming signal at terminal 72 and that there is also no variation of loop current due to speech activity at the subscriber handset. Most commonly, the hybrid must provide to the load (the telephone instrument in the loop) a 48 volt battery having in series therewith a 400 ohm resistance. When the subset is on hook, the ring and tip terminals are open. No metallic (normal mode) current can flow in resistors R1 (99) and R2 (97) and thus, the input current at current mirror circuits 2 and 10 is zero. The various current outputs of current mirror circuits 2 and 10 are likewise zero. Since the switch output of current mirror circuit 2 is off (no current in R1), operational amplifiers 16 and 22 and the voltage reference circuit 42 have no bias applied thereto. Therefore, reference pulldown resistor 52 pulls the reference voltage to $V_{EE}$.

No current flows in any part of the circuit if the tip and ring terminals are open. When a load resistance $R_L$ is connected across the tip and ring terminals 104 and 102, (when the telephone instrument goes off hook), a circuit is completed between current mirror circuit 10, resistors 97, 98, 100 and 99, and current mirror circuit 2. Furthermore, the switch at output 130 of current mirror circuit 2 turns on since there is current flowing in R1, and as a result operational amplifiers 16 and 22 and reference voltage generator 42 are biased on.

At first glance, it would appear that the resistance provided to the load is not the required 400 ohms but is approximately 33K ohms. This is not the case however. The current flowing in resistors 97 and 99 are applied to inputs of current mirror circuits 10 and 2 respectively. This will cause currents to flow in outputs 140 and 142 at mirror circuits 2 and 10 respectively. Output 140 is applied to the input terminal of current mirror circuit 12 which in turn generates an output 144. Outputs 142 and 144 are summed at 146; their polarities being such that they add. Since all available DC paths lead to node 74, the current at node 74 will equal the summed outputs of mirror circuits 10 and 12. The current is applied via transistor 46 which is normally on to the input of the current mirror circuit comprised of transistors 34 and 36, resistors 24, 26 and 28, operational amplifier 16 and transistors 18. A first output of this current mirror circuit is applied to node 92. A second output is applied to the noninverting input of operational amplifier 22 causing current to flow therethrough from node 94. If resistors 24, 26, 28, 30 and 32 have values of 237 ohms, 950 ohms, 10 ohms, 950 ohms, and 10 ohms respectively and if current mirror circuits 2, 10 and 12 are constructed so as to have the multiplication factors shown in FIG. 1, the gain of operational amplifiers 16 and 22 (K1) becomes 23.75. The gain due to current mirror circuits 2, 10 and 12 (K2) is four. Thus, if the current in R1 and R2 is IN, the current in 92 and 94 is K1·K2·IN or 23.75 times 4 times IN. Therefore, the total current in the load is (1+K1K2) IN. The DC feed resistance becomes $$r_f = \frac{(R1 + R2)}{1 + K1K2} + R3 + R4 \tag{1}$$

The equivalent impedances of resistors 97 and 99 have been reduced by a factor of 96 and each becomes approximately 170 ohms. Thus $r_f$ becomes 400 ohms. The loop current will be $$I_{LOOP} = \frac{V_{CC} - V_{EE}}{R_L + r_f} \tag{2}$$

where $R_L$ is the loop resistance.

While the DC termination as described above must appear as 400 ohms, the AC termination (above 300 Hz) must appear as 900 ohms. Assume that an AC generator is placed in series with the loop resistance causing a differential signal across the ring and tip terminals 102 and 104 at a frequency of between 300 and 3400 Hz (speech). The impedance presented to the AC generator is the load impedance of the loop plus the termination resistance $R_0$.

In the above description of the DC characteristics of the hybrid circuit, it was described how the summed outputs of current mirror circuits 10 and 12 at node 146 would travel the DC paths to node 74. In the AC case however, it should be apparent that only a portion of the current will flow to node 74 and the remainder of the current will flow to node 70 since the current sees AC ground at both nodes. The amount of current flowing to node 74 is determined by the ratio of resistor 54 to the sum of resistors 54 and 50. This fraction may be denoted K5. With resistor 50 equal to 2.5K ohms and resistor 54 equal to 1.66K ohms, K5 becomes 0.4. The AC termination equation then becomes:

$$r_o = \frac{R1 + R2}{1 + K1K2K5} + R3 + R4 \quad (3)$$

where K1 equals 4, K2 equals 23.75, K5 equals 0.4, R1 and R2 equal 16.4K ohms and R3 and R4 equal 30 ohms. The resultant AC termination equals the required 900 ohms. The AC current through the circuit then becomes $$i_g = \frac{V_G}{R_L + r_o} \quad (4)$$

where $V_G$ is the generator voltage. The AC normal mode current in resistors R1 and R2 is given by $$\frac{i_g}{1 + K1K2K5} \quad (5)$$

and the output signal current appearing at node 148 is $$i_{TX} = i_g \frac{K1(1 - K5)}{(1 + K1K2K5)} \quad (6)$$

Thus, the voltage appearing at node 68 ($V_{TX}$) is defined by:

$$\frac{V_{TX}}{V_G} = \frac{K1(1 - K5)}{1 + K1K2K5} \cdot \frac{R8}{R_L + r_o} \quad (7)$$

where R8 is the resistance of resistor 64. This voltage corresponds to the outgoing signal which resulted from the imposition of an AC speech component across the tip and ring terminals 104 and 102 of the loop. It should be clear that the transmit gain voltage of the hybrid circuit can be set to any desired value by properly selecting the value of R8 (resistor 64).

The next mode to be considered occurs when information applied to terminal 72 is to be transmitted to a subset coupled to tip and ring terminals 104 and 102. An AC voltage applied to terminal 72 will pass through capacitor 60 and resistor 48 and be converted to an AC current at node 74. This AC current modulates the DC current already flowing through node 74 as described above. This current flows through transistor 46 and into the current mirrors including operational amplifiers 16 and 22 as previously described; therefore, the current flowing out of the collector of transistor 46 multiplied by a factor of 23.75 flows into nodes 92 and 94. This multiplied AC current modulates the DC current in the load (the telephone instrument) and represents received speech.

At first glance, it might appear that AC current flowing in the loop as a result of an AC signal being applied to terminal 72 would be transmitted back to output terminal 68 just as would AC current originating at the telephone instrument due to speech. However, the path travelled by AC signals applied to input terminal 72 to the loop and then back again to output node 70 is such as to create a single phase inversion. As can be seen from FIG. 1, a portion of the AC signal applied from a low impedance source to terminal 72 will flow into the series combination of resistors 56 and 58 to node 70. By properly scaling resistors 56 and 58, the reflected signal from the loop may be entirely cancelled by the signal passing through resistors 56 and 58 due to their phase difference. Thus, no output voltage will appear at output node 68. This is illustrated as follows, assume a two wire load $R_L$ across terminals 104 and 102 and a voltage generator $V_G$ coupled to input terminal 72. The generator sees a low impedance at node 74 as long as VAG (terminal 84) is coupled to a DC potential. The current into node 74 is simply $$i_{RX} = \frac{V_G}{R5}$$

where R5 is the resistance of resistor 48. This current is multiplied by K1 in the current mirror circuits employing operational amplifiers at 16 and 22. The multiplied currents drive a load $R_L$ (the loop resistance) plus the resistance of resistors 98 and 100 in parallel with $R1 + R2)/(1 + K1 K2 K5)$. Thus, the voltage gain from input terminal 72 to tip and ring terminals 104 and 102 is $$\frac{V_{R_L}}{V_{RX}} = \quad (8)$$

$$= K2 \frac{R_L}{R5} \cdot \frac{R1 + R2}{(R1 + R2) + (R_L + R3 + R4)(1 + K1K2K5)}$$

The signal current across the load is in-phase with the current at terminal 72 and out of phase with the termination resistance $R_0$. The current in $R_0$ causes the current $I_{TX}$ to appear at node 148. As stated previously, the current may be cancelled for any load $R_L$ by properly selecting the sum R6 (58) plus R7 (56). Balance is achieved for a load $R_L$ by making the sum of R6 and R7 equivalent to $$(R6 + R7) = \frac{R5(1 + K1K2K5)}{K1K2(1 - K5)} \cdot \frac{R1 + R2 + (R_L + R3 + R4)(1 + K1K2K5)}{R1 + R2} \quad (9)$$

The above described phenomenon is known as trans-hybrid rejection and is controlled by the equation (9).

The above completes the description of normal transmission through the hybrid. The remainder of the specification relates to how the hybrid deals with unwanted and spurious signals.

The loop coupled to tip and ring terminal 104 and 102 is subject to sixty cycle interference. The interferring signals are referred to as longitudinal or common mode signals as opposed to the legitimate differential signals superimposed on the loop by speech at the telephone instrument. The longitudinal signals are imposed on each side of the pair and obviously need to be suppressed especially at the output terminal 68. Of course, it is still necessary to receive the legitimate differential signals corresponding to speech. The interferring longitudinal currents at terminals 104 and 102 flow in-phase and towards the hybrid giving rise to currents in resistors R1 (99) and R2 (97) as described earlier. The interferring currents are out of phase with the signal currents which flow out of phase.

In the absence of longitudinal currents, the currents flowing into the input terminals of current mirror circuits 2 and 10 would be substantially equal. Thus, the current flowing out of current mirror circuits 2 and 10 at outputs 152 and 150 respectively would likewise be equal. That is, current mirror circuit 2 would be sourcing an amount of current at output 152 substantially equal to the amount of current being sunk at output 150 of current mirror circuit 10. However, due to the longitudinal interference, there is an AC mismatch. This mismatch is reflected by a current $i_x$ flowing through conductor 154 which is coupled to outputs 150 and 152. Current $i_x$ is coupled to the bases of transistors 38 and 40 the emitters of which receive the reference voltage (approximately $-24$ volts) from reference voltage generator 42. The collector of transistor 38 is coupled to the input of current mirror circuit 6, and the collector of transistor 40 is coupled to the input of current mirror circuit 14. The current $i_x$ may flow either into the bases of transistors 38 and 40 in which case the current will be denoted as being negative or out of the bases of transistors 38 and 40 in which case the current will be denoted as positive. Current $i_x$ is positive when current mirror circuit 10 is sinking more current than is being sourced by current mirror circuit 2. On the other hand, if current mirror circuit 2 is sourcing more current than current mirror circuit 10 can sink, a negative current will flow in conductor 150. In the case of the positive $i_x$, the current through resistor R1 (99) is less than the current flowing through resistor R2 (97). If, on the other hand the current through resistor R1 is greater than that through resistor R2, $i_x$ will be negative.

If for example current $i_x$ is positive, transistor 40 will be turned on which turns on current mirror circuit 14. Current will then flow in outputs 156 and 158 which are coupled respectively to nodes 94 and 92. In this manner, the current through resistor R2 will be reduced, and the current through resistor R1 will be increased. On the other hand, if current $i_x$ in conductor 154 were negative, transistor 38 would turn on causing current mirror circuit 6 to be activated. Thus outputs 160 and 162 of current mirror circuit 6 will source additional current into nodes 94 and 92 respectively thus increasing the current through resistors R2 and decreasing the current through resistor R1. This process has a tendency to cause an adsorption of the majority of longitudinal currents flowing in the loop.

Notwithstanding the above, a small longitudinal component will remain at the tip and ring terminals. However, these signals are in-phase and due to the inversion created by current mirror circuits 2, 10 and 12 these signals cancel.

The hybrid circuit shown in FIG. 1 provides means for monitoring the conditions of the tip and ring terminals 104 and 102 respectively. For example, it would be desirable to know if the subset coupled to the tip and ring terminals is on hook or off hook, or if the ring or tip terminals become grounded or in some way coupled to sixty cycle energy since telephone lines are normally strung in close proximity to both earth ground and power lines. Additionally, it is not uncommon for telephone lines to be struck by lightning.

In order to monitor the conditions of the tip and ring terminals, an additional output 164 is provided from current mirror circuit 2. The multiplication factor is such that current flowing through R1 also flows in output 164. This output is brought to an output terminal TS (78) (Tip Sense). To monitor the ring terminal, current mirror circuit 10 is provided with an additional output 166 along which flows a current equal to approximately 25 percent of the input current to current mirror circuit 10. Output 166 is applied to the input of an additional current mirror circuit 4 which multiplies the input current by a factor of 4 to produce a current equivalent to that flowing through resistor R2 (97) on output conductor 168. This output is brought to an output terminal RS (80) (Ring Sense). As stated previously, during normal operating conditions, the currents through resistors R1 and R2 should be equal. When the telephone instrument is on hook, no current flows through R1 and R2. Loop fault conditions such as grounding will be reflected by alterations in the currents at the tip and ring sense terminals 78 and 80.

The circuit shown in FIG. 1 provides three kinds of circuit protection against fault conditions at the tip and ring terminals. These are: (1) DC; (2) transient AC (lightning); and (3) AC (power line).

To illustrate how the circuit provides DC protection, it must be remembered that normally the hybrid circuit must provide a 48 volt battery with a 400 ohm source imepdance to the loop. This has normally been done by splitting the 400 ohms into two 200 ohm resistors on each side of the line. Thus, if the loop should become short circuited, a current of 48/400 or 120 milliamps would flow. If, however, the ring terminal should be grounded, the completed circuit would include only a 200 ohm resistor resulting in a current flow of 240 milliamps. This raises substantially the power requirements of the hybrid and is therefore undesirable.

During normal operation, current flowing through resistor R1 (99) will flow through the loop and through resistor R2 (97). If the ring terminal becomes grounded due to a fault condition, a large current will flow through resistor R2 but no current flows in resistor R1.

As stated previously, a switch has been added to current mirror circuit 2 which is on when current is flowing through resistor R1 and off when no current is flowing through resistor R1. The output of this switch controls the bias to the reference voltage generator 42 and operational amplifiers 16 and 22. Thus, when the switch is off, reference voltage generator 42 and operational amplifiers 16 and 22 are disabled and transistors 18 and 20 are held in an off condition. Therefore, the current flowing into the ring terminal 102 sees the series combination of resistors 98 and 97 (approximately 16.4K ohms). The current has therefore been limited to 48/16.4 or approximately 3 milliamps. The effect of the ground fault at the ring terminal has been substantially reduced. If eliminated entirely, there would be no way to detect the fault condition. However, since a small current (3 milliamps) is flowing in R2 and no current is flowing in R1, the tip sense and ring sense terminals 78 and 80 respectively will indicate the fault condition.

Obviously, since there is a current flowing through resistor R2 and no current is flowing through resistor R1, there will be a substantial current imbalance between output 152 of current mirror circuit 2 and output 150 of current mirror circuit 10. During normal conditions such an imbalance would result in the turning on of either transistor 38 or transistor 40. However, as a result of the removal of the bias to the reference voltage generator 42 through the action of the switch contained in the current mirror circuit 2, the reference voltage is pulled to $V_{EE}$ via resistor 52. Therefore, PNP transistor 40 is prevented from turning on since there is no source for current at its emitter.

As additional advantage to the switching action of current mirror circuit 2 relates to power consumed by the hybrid. When the subset coupled to the tip and ring terminals is on hook, no current flows through resistor R1 (99). As a result, the switch in current mirror circuit 2 removes the bias from the reference voltage generator 42 and operational amplifiers 16 and 22. Thus, no power is drawn when the subset is on hook.

The second type of protection offered by the hybrid circuit of FIG. 1 prevents damage to the hybrid as a result of lightning striking the loop. This is accomplished by means of diodes 106, 108, 110 and 112 and resistors R3 (100) and R4 (98). The diode bridge shown is commercially available from Motorola Semiconductor Inc. and bears Part No. MDA220. It is capable of accommodating a sixty amp non-repetitive surge. The industry requires that the hybrid offer secondary protection sufficient to accommodate a 1500 volt pulse which peaks in 10 microseconds. Thus, the protection circuitry must be capable of handling 1500/30 or 50 amps. Clearly, the diodes can accommodate this and limit the voltage at nodes 92 and 94 to approximately 10 volts. The positive 1500 volts applied to the tip terminal 104 would cause diode 106 to conduct whereas a negative 1500 volts applied to the tip terminal will render diode 110 conductive. Similarly, a positive 1500 volt supply to the ring terminal will render diode 108 conductive while a negative 1500 volts applied to the ring terminal will render diode 112 conductive.

Finally, power line faults due to 120 volt 60 cycle lines will be half-wave rectified; i.e., shared between two of the diodes in the diode bridge. Each diode would be required to carry 2 amps rms.

Under certain conditions, it would be desirable to disable the reference voltage generator and operational amplifiers 18 and 20 independent of whether or not current is flowing in resistor R1. For example, it would be advantageous to have the ability to disable power dissipation in a faulted loop without losing the ability to sense that loop. For example, a large telephone office may accommodate 1200 lines. However, the same office may be equiped to handle only 10 percent of those lines at any one time. When more than 10 percent of the subscribers go off hook, it is likely that the excess will not receive a dial tone. However, using prior art systems, the hybrids associated with those subscribers which cannot be serviced will still dissipate power since a completed circuit exist from $V_{EE}$ (node 96) through current mirror circuit 10, resistor R2 (97), resistor R4 (98), the loop, resistor R3 (100), resistor R1 (99), current mirror circuit 2 to $V_{CC}$ (earth ground). Additionally, a single subscriber who has left his phone off hook for long periods of time will cause a large amount of power to be dissipated unnecessarily.

The hybrid circuit shown in FIG. 1 includes means for disabling voltage reference generator 42 and operational amplifiers 16 and 22 without losing the ability to sense the loop currents at RS and TS (terminals 80 and 78 respectively). A power down terminal 128 ($\overline{PD}$) is provided and coupled to switch 126 shown as a transistor in FIG. 3. When $\overline{PD}$ goes low, switch 126 opens thus disabling reference voltage generator 42 and operational amplifier 16 and 22 independently of whether or not current is flowing in resistor R1.

How the hybrid circuit in FIG. 1 reduces the effects of longitudinal signals in the loop has been previously described. Under certain circumstances, it may be desirable to be able to monitor these longitudinal signals. To accomplish this, current mirror circuit 6 is provided with an additional output 170 which is in turn coupled to terminal 82 (LS). Current mirror circuit 14 is also provided with an additional output 172 which is coupled to the input of current mirror circuit 8. The output 174 of current mirror circuit 8 is summed with output 170 and applied to terminal 82. In this manner, a full wave rectified component of the signals appearing at the outputs of current mirror circuit 6 and current mirror circuit 14 is provided at terminal 82. This component is a good measure of the longitudinal signal being suppressed.

We claim:

1. A direct coupled hybrid circuit for providing signal coupling between a balanced bidirectional transmission path and a pair of unbalanced unidirectional transmission paths, said hybrid circuit comprising:

first and second loop terminals coupled to said bidirectional transmission path;

first and second unidirectional terminals coupled to a different one of said pair of unidirectional transmission paths;

a plurality of current mirror circuits coupled between said loop terminals and said unidirectional terminals, said plurality of current mirror circuits including current mirror circuits for coupling signals at said loop terminals to said second unidirectional terminal and including current mirror circuits for coupling incoming signals on said first unidirectional terminal to said loop terminals;

first resistive means coupled between said first loop terminal and a first one of said plurality of current mirror circuits;

second resistive means coupled between said second loop terminal and a second one of said plurality of current mirror circuits; and means for altering the equivalent resistance of said first and second resistive means across said first and second loop terminals from a first predetermined value to a second predetermined value in response to current flowing in only said first resistive means.

2. A hybrid circuit according to claim 1 wherein said means for altering comprises:

switching means for assuming a first state when current is flowing in said first resistive means and for assuming a second state in the absence of current in said first resistive means; and current sourcing means coupled to said first and second resistive means for increasing current through said first and second resistive means.

3. A hybrid circuit according to claim 2 wherein said first resistive means comprises first and second series connected resistors.

4. A hybrid circuit according to claim 3 wherein said second resistive means comprises third and fourth series connected resistors.

5. A hybrid circuit according to claim 4 wherein said current sourcing means comprises first and second additional current mirror circuits, said first additional current mirror circuit having an input coupled to said loop and having first and second outputs, said first output coupled to a junction of said first and second resistors, said second additional current mirror circuit having an input coupled to said second output and having an output coupled to the junction of said third and fourth transistors.

6. A hybrid circuit according to claim 5 wherein each of said first and second additional current mirror circuits includes an operational amplifier which is biased on by said switching means.

7. A hybrid circuit according to claim 6 further including means for disabling the operational amplifiers in said first and second additional current mirror circuits when current is not flowing in said first resistive means.

8. A hybrid circuit according to claim 6 wherein said second and fourth resistors have substantially higher resistances than that of said first and third resistors.

9. A direct coupled hybrid circuit for providing signal coupling between a balanced bidirectional transmission path and a pair of unbalanced unidirectional transmission paths, said hybrid circuit comprising:

first and second loop terminals coupled to said bidirectional transmission path;

first and second unidirectional terminals coupled to a different one of said pair of unidirectional transmission paths;

a plurality of current mirror circuits coupled between said loop terminals and said unidirectional terminals, said plurality of current mirror circuits including current mirror circuits for coupling signals at said loop terminals to said second unidirectional terminal and including current mirror circuits for coupling incoming signals on said first unidirectional terminal to said loop terminals;

said first loop terminal and a first one of said plurality of current mirror circuits adapted to be coupled to first resistive means;

said second loop terminal and a second one of said plurality of current mirror circuits being adapted to be coupled to second resistive means; and means for altering the equivalent resistance of said first and second resistive means across said first and second loop terminals from a first predetermined value to a second predetermined value in response to current flowing in only said first resistive means.

* * * * *